US012217301B1

(12) United States Patent
Villamar

(10) Patent No.: US 12,217,301 B1
(45) Date of Patent: Feb. 4, 2025

(54) SYSTEM AND METHOD FOR COORDINATED ONLINE ORDERING AT A DRIVE-THRU RESTAURANT AT A QUICK SERVICE RESTAURANT FACILITY

(71) Applicant: RunTime IP, LLC, Hurst, TX (US)

(72) Inventor: Richard D. Villamar, Arlington, TX (US)

(73) Assignee: RunTime IP LLC, Ft. Lauderdale, FL (US)

( * ) Notice: Subject to any disclaimer, the term of this patent is extended or adjusted under 35 U.S.C. 154(b) by 0 days.

(21) Appl. No.: 18/207,956

(22) Filed: Jun. 9, 2023

(51) Int. Cl.
G06Q 30/0601 (2023.01)
G06Q 20/20 (2012.01)
G06Q 50/12 (2012.01)

(52) U.S. Cl.
CPC ....... G06Q 30/0635 (2013.01); G06Q 20/208 (2013.01); G06Q 50/12 (2013.01)

(58) Field of Classification Search
CPC ... G06Q 30/0635; G06Q 20/208; G06Q 50/12
See application file for complete search history.

(56) References Cited

U.S. PATENT DOCUMENTS

| | | | |
|---|---|---|---|
| 4,884,662 A | 12/1989 | Cho et al. | |
| 4,901,482 A | 2/1990 | Lockard et al. | |
| 5,921,036 A | 7/1999 | Murphy | |
| 7,054,832 B1 | 5/2006 | Vallabh | |
| 7,895,797 B2 | 3/2011 | Bridgman et al. | |
| 8,543,665 B2 * | 9/2013 | Ansari | G05B 19/042 |
| | | | 709/219 |
| 10,860,995 B2 * | 12/2020 | Kelly | G06Q 20/327 |
| 11,443,260 B1 | 9/2022 | van Breen | |
| 2003/0149633 A1 | 8/2003 | McConnell | |
| 2003/0195821 A1 | 10/2003 | Kennamer | |
| 2005/0182687 A1 | 8/2005 | Godfrey, Jr. | |

(Continued)

OTHER PUBLICATIONS

World-First Drive Thru Only KFC Opens It's 'Boom Gates' in Newcastle, global.kfc.com. https://global.kfc.com/press-releases/world-first-drive-thru-only-kfc-opens-its-boom-gates-in-newcastle/ [Date accessed: Dec. 18, 2022].

(Continued)

*Primary Examiner* — Fahd A Obeid
*Assistant Examiner* — Jessica E Sullivan
(74) *Attorney, Agent, or Firm* — Bold IP PLLC

(57) ABSTRACT

A system for coordinating pickup of online orders provided at a quick service restaurant facility having multiple drive through lanes. The system includes a designated drive through lane for each drive through store at the quick service restaurant facility and has a designated security or barrier gate at the facility. The customers order and pay prior to arriving to the QSR facility on an online application associated with each drive through store. An arrival time and identifying gate code is communicated to either the customer or a delivery driver to enter through the security gate. If the recipient of the arrival time and the code arrive too early, the recipient is directed to a waiting area at the facility. Otherwise, the recipient is allowed to pass through the barrier gate and provided with the previously ordered online food order and the order is verified as being associated with the identifying gate code.

14 Claims, 7 Drawing Sheets

(56) References Cited

U.S. PATENT DOCUMENTS

| | | | |
|---|---|---|---|
| 2007/0150336 A1* | 6/2007 | Boily | G07B 15/00 |
| | | | 705/13 |
| 2007/0174142 A1 | 7/2007 | Kissel, Jr. | |
| 2007/0187183 A1* | 8/2007 | Saigh | E04H 14/00 |
| | | | 186/53 |
| 2012/0086549 A1* | 4/2012 | Barnes, Jr. | G06Q 20/04 |
| | | | 340/5.61 |
| 2013/0024299 A1 | 1/2013 | Wong et al. | |
| 2013/0117078 A1* | 5/2013 | Weik, III | G06Q 10/00 |
| | | | 705/13 |
| 2016/0244311 A1* | 8/2016 | Burks | B67D 1/0888 |
| 2019/0012625 A1* | 1/2019 | Lawrenson | G06Q 10/0631 |
| 2022/0284488 A1 | 9/2022 | Bamadhaj | |

OTHER PUBLICATIONS

Taco Bell opens futuristic two-story drive-thru complete with food elevators, today.com. https://www.today.com/food/restaurants/taco-bell-futuristic-drive-thru-rcna32393 [Date accessed: Dec. 18, 2022].
Chipotle hides the assembly line, testing new online-order-only 'Digital Kitchen', theverge.com. https://www.theverge.com/2021/12/17/22840498/chipotle-digital-kitchen-app-delivery-only-ohio [Date accessed: Nov. 21, 2022].

* cited by examiner

SYSTEM AND METHOD FOR COORDINATED ONLINE ORDERING AT A DRIVE-THRU RESTAURANT AT A QUICK SERVICE RESTAURANT FACILITY

FIELD OF THE DISCLOSURE

The present description relates to one or more non-limiting embodiments for drive-through establishment having multiple drive-through lanes for multiple drive through stores with a controlled electronic gate positioned before the drive through window of each drive through lane. The gate is electronically connected to one or more computer applications and/or point of sale devices associated with the drive through store in order to only provide entry to a pick up party (whether the pickup person is the end customer or a delivery person) when the order provided by the drive through establishment is ready for pick up, whereby the order has been pre-ordered online through one or more applications and the user provides an identifying gate entry code that coordinates with an arranged arrival time to allow gate access/entry.

BACKGROUND

Drive through establishments exist in many places of the world and are known for allowing users to order, pay and pick up food and drink orders from the comfort of their vehicles. However, it is frequently still a time-consuming process to order and pay in person at a drive through establishment making it necessary to have bypass lanes built into the layout of the drive through lanes. These additional ground space requirements increase the costs to develop a drive through concept and therefore becomes exclusive to large brands with the capital resources to invest.

Accordingly, there is still a need for an improved means of managing vehicle flow through a drive through establishment and to reduce development costs thus opening this sector up to smaller brands.

SUMMARY

The present description is drawn to a computer implemented method for managing a pick up time for a recipient of an exclusively online order at one or more drive through stores from a quick service restaurant (QSR) facility comprising providing a QSR facility having multiple drive through stores, wherein each drive through store comprises an individually operated electronic barrier gate for each drive through lane of each drive through store. The individual electronic barrier gate for each drive through lane of each drive through store grants access or denies access to a customer or delivery driver trying to access the drive through store responsive to receiving an identifying gate entry code and arrival time. The method further includes, by one or more computer systems, receiving a notification for an online order from the customer for an item provided by a particular drive through store of the one or more drive through stores, wherein the online order is made by the customer on an online application and not at the drive through store.

By one or more computer systems, the method further includes determining the identifying gate entry code and the arrival time to transmit to the customer or an assigned driver to pick up a fulfilled order from the particular drive through store of the drive through stores at the QSR facility. By one or more computer systems, the method includes transmitting the identifying entry code and the arrival time to the customer or to the delivery driver associated with the online order, wherein the arrival time is an expected time when the online order is expected to be ready for pick up from the drive through store at the QSR facility. The method further includes, by one or more computer systems, transmitting the identifying entry code and the arrival time to the operating system of the dedicated barrier gate of the drive through store where the online order is expected to be ready for pickup. By one or more computer systems, responsive to receiving the identifying entry code at a display panel for the dedicated barrier gate from the customer or the delivery driver, determining, by a processor associated with the individual electronic barrier gate, whether the arrival time associated with the identifying entry code has passed or has not yet occurred.

The method further includes by one or more computer systems, responsive to determining that the arrival time associated with the identifying entry code has passed, allowing access to the drive through lane associated with the drive store at the QSR facility, wherein the individual electronic barrier gate allows a vehicle associated with the customer or delivery driver through the dedicated barrier gate and to the drive through lane in order for the customer or the delivery driver to pick up a fulfilled order provided by the particular drive through.

The method further includes, by one or more computer systems, responsive to determining that the arrival time associated with the identifying entry code has not yet occurred, denying access through the individual electronic barrier gate, wherein the individual electronic barrier gate does not automatically open to allow the vehicle to pass through to the drive through store. Responsive to the arrival time associated with the identifying entry code not yet occurring, the method includes directing the vehicle using signaling equipment to wait in a dedicated waiting area associated with the QSR facility until the arrival time occurs. Accordingly, the QSR facility includes dedicated waiting areas for the recipient to wait in until the arrival time occurs and the recipient may proceed through the drive through lane of the particular drive through store. Further, in a non-limiting embodiment, the individual electronic barrier gate may provide a number or other marker for a spot associated with the waiting area that the customer or driver is supposed to wait in, and further share this number or other marker with the computing systems of the drive through store, such that the workers of the store may be able to bring out a fulfilled order to the customer or driver in the waiting area at the particular spot.

The step in the method related to transmitting an identifying entry code and an arrival time to the customer or to a delivery driver associated with the online order may further include in a non-limiting embodiment obtaining a telephone number for either the customer or the delivery driver from the online application, and transmitting via a text message to the telephone number the identifying entry code and the arrival time.

The computer implemented method may further include having a QSR computer module integrated into the one or more computer systems of the particular drive through store at the QSR facility, wherein the QSR computer module communicates with the online application and is adapted to obtain the telephone number of either the customer or the delivery driver associated with the online order. The QSR computer module may also be integrated with the online merchant application. Further, the QSR computer module may be integrated into the one or more computer systems of the particular drive through store at the QSR and communicate with an online ordering (OLO) platform to obtain the telephone number of the customer or the delivery driver associated with the online order.

The computer implemented method may further include calculating an arrival time based on items selected for the online order, wherein the arrival time is calculated by the QSR computer module integrated into the one or more computer systems of the particular drive through store at the QSR facility. In a non-limiting embodiment, calculating the arrival time based on the items selected may further comprise retrieving from storage associated estimated times for preparation of items selected by the customer for the online order and calculating a sum total to achieve the arrival time based on a sum of the estimated times. In a non-limiting embodiment, transmitting the identifying entry code and the arrival time to the customer or to the delivery driver further comprises providing the identifying entry code and the arrival time through the online application or delivery services application associated with the online application or through a separate application associated with the QSR facility that is accessible by the customer or the delivery driver. In a non-limiting embodiment, the identifying entry code is also an order number associated by the particular drive through store with the online order.

In a non-limiting embodiment, responsive to directing the customer or the delivery driver to the dedicated waiting area, the method includes providing a prompt regarding the arrival time in order to enable the customer or the delivery driver to return to the individual electronic barrier gate that the arrival time. In a non-limiting embodiment, the computer implemented method further comprises receiving notification of a type of the vehicle associated with the customer or the delivery driver and transmitting the notification of the type of the vehicle to the point of sale (POS) system of the particular drive through store or to another application associated with a computing device of the particular drive through store in order to associate the type of the vehicle with the online order and order number to ensure the correct online order is provided to a correct customer or correct delivery driver picking up the online order. In a non-limiting embodiment, the computer implemented method may further include associating the identifying gate entry code with the fulfilled order for pick up by the customer or the driver.

The computer implemented method further comprises using a user identification device to check that an order being provided to the recipient is correct, which further comprises, using the user identification device to scan or otherwise communicate with a barcode located on a physical package containing the order and checking that the barcode is associated with the online order. The user identification device used to scan the barcode may be a scanner, and the barcode placed on the order is associated with the identifying gate entry code. In a non-limiting embodiment, the identifying gate entry code is unique to the recipient.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description is drawn to one or more non-limiting embodiments for a quick service restaurant (QSR) facility that has an improved system and method for coordinating pick up at a correct time for online orders made in advance of arriving at the QSR facility. The system described herein in one or more non-limiting embodiments aims to reduce the wait time and reduce vehicle congestion and traffic for customers and/or delivery drivers who intend to pick up online orders made in advance of arriving at the drive through stores associated with the QSR facility. Further details are provided below with respect to the Figures.

Figure 1:
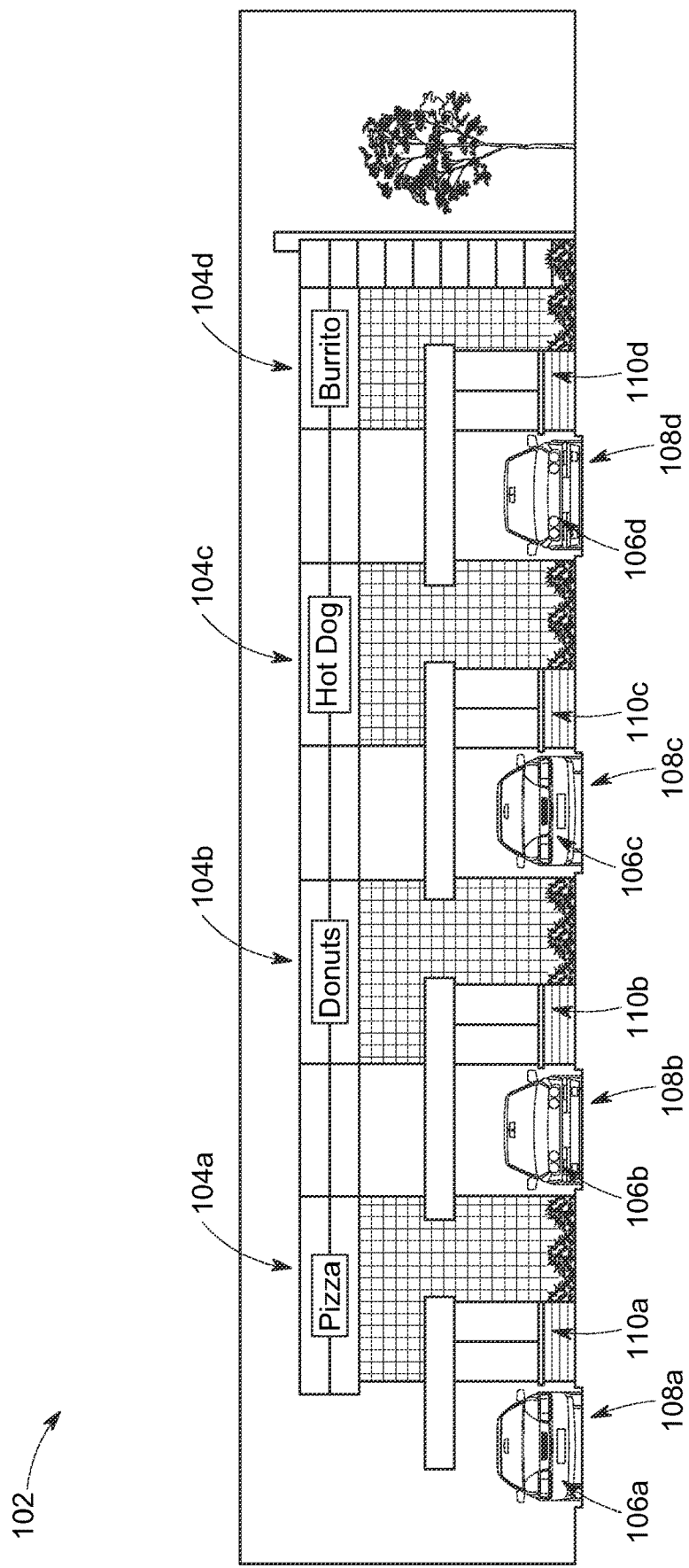
FIG. 1 depicts a pictorial illustration for an exemplary quick service restaurant (QSR) facility for servicing online orders.
Figure 2:
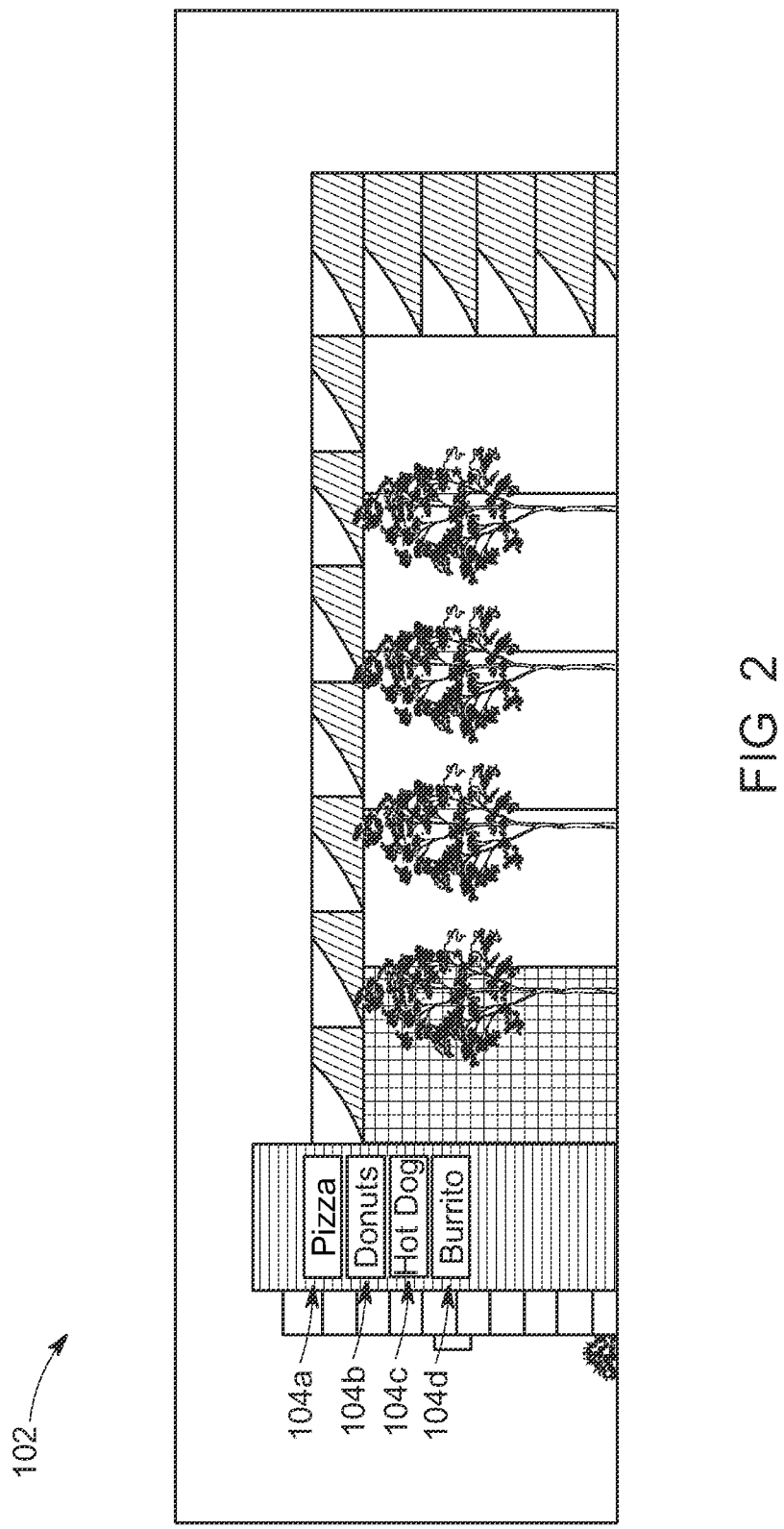
FIG. 2 depicts a pictorial illustration of another view of the exemplary quick service restaurant (QSR) facility.

FIG. 1 and FIG. 2 show an exemplary pictorial illustration of a quick service restaurant (QSR) facility 102 in accordance with one or more non-limiting embodiment. A quick service restaurant (QSR) location such as QSR facility 102 is known for multiple restaurants categorized by fast service, and a focused menu. In a non-limiting embodiment, the QSR facility 102 shown in FIG. 1 and in FIG. 2 may be a facility that has a physical location at a particular site. The facility itself is a building or structure arranged to have multiple drive through restaurants. For example, as shown in FIG. 1, there may be four drive through restaurants 104a, 104b, 104c, 104d. The term "restaurant" as used herein may interchangeably be used with the term "store."

Each drive through restaurant 104a, 104b, 104c, and 104d may have its own drive through lane 106a, 106b, 106c, 106d for vehicles, such as vehicles 108a, 108b, 108c, and 108d to drive through to reach the drive through window or access point 110a, 110b, 110c, and 110d. It is noted that the QSR facility 102 may have more than four drive through enabled restaurants, such as 104a-104d, including up to a much greater number or may have less than four drive through enabled restaurants 104. The number and arrangement of drive through restaurants 104a-104d shown in FIG. 1 is exemplary and non-limiting.

Figure 4:
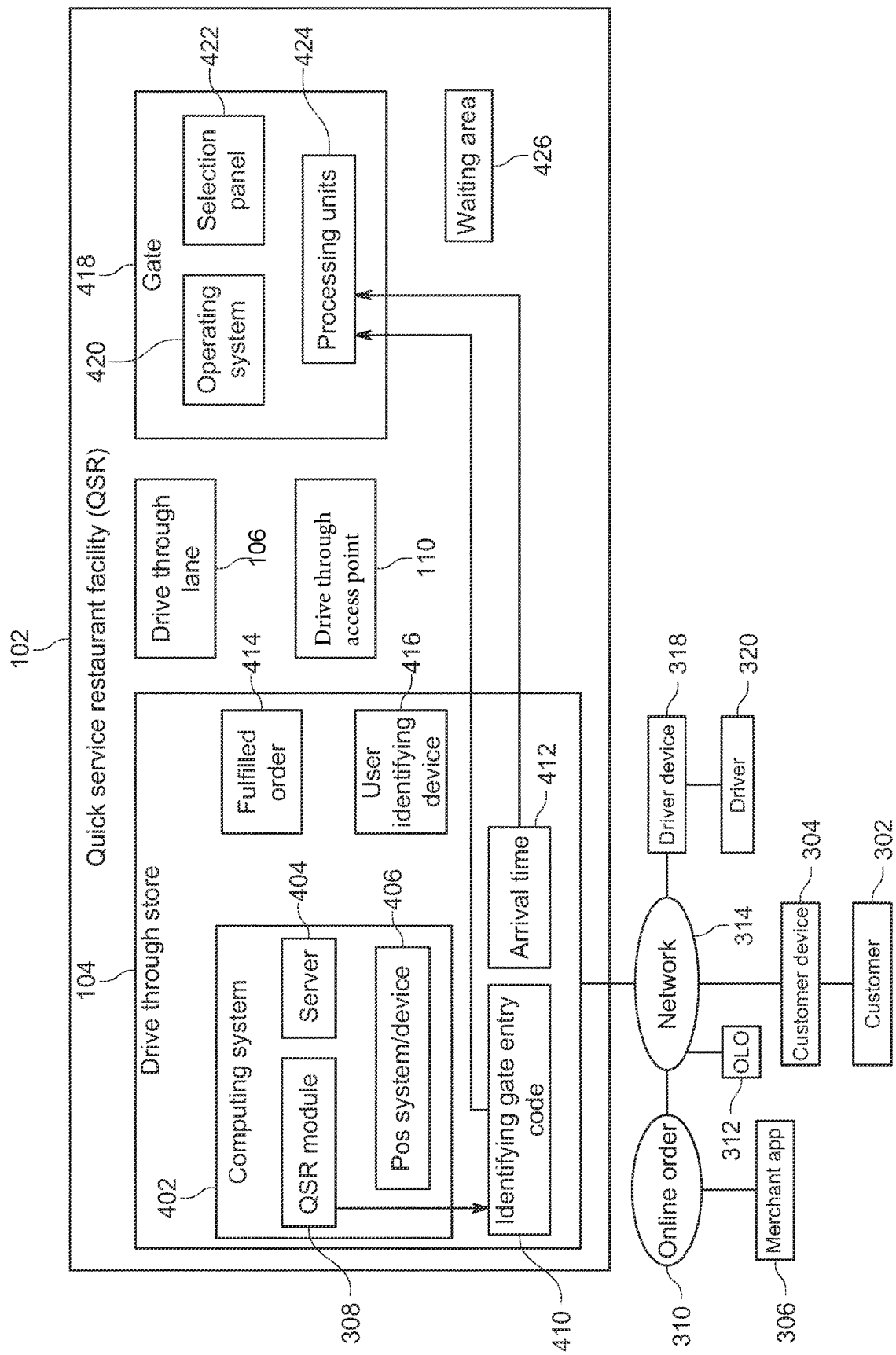
FIG. 4 depicts a block diagram of components of a system associated with the QSR facility ordering process.

The drive through restaurants 104a-104d may each have their own brand or specialization of food and/or drink offerings according to one or more non-limiting embodiments. For example, as shown in FIG. 1, a first drive through restaurant 104a may offer pizza, a second drive through restaurant 104b may offer donuts, a third drive through restaurant 104c may offer hot dogs, and a fourth drive through restaurant 104d may offer burritos. This is an example only and instead of type of food and/or drinks being written on the banner/signs of the QSR facility 102, the name of the drive through restaurant 102 may be written and displayed on the building/structure for the QSR facility 102. A variety of signs may be provided having different descriptions and restaurant names on the exterior surfaces of the QSR facility 102. Notably, the QSR facility 102 is configured to have multiple drive through lanes 106a-106d such that the vehicles 108a-108d access the individual restaurants 104a-104d primarily and exclusively from the drive through lanes 106a-106d to obtain their finalized orders. The QSR facility 102 is a quick service structure that houses multiple types and brands associated with drive through stores 104 that can quickly and efficiently process vehicular traffic and flow through the QSR facility 102 and through designated drive through lanes 106 and in the waiting area 426 (e.g., as shown in FIG. 4 and in FIG. 5).

Figure 3:
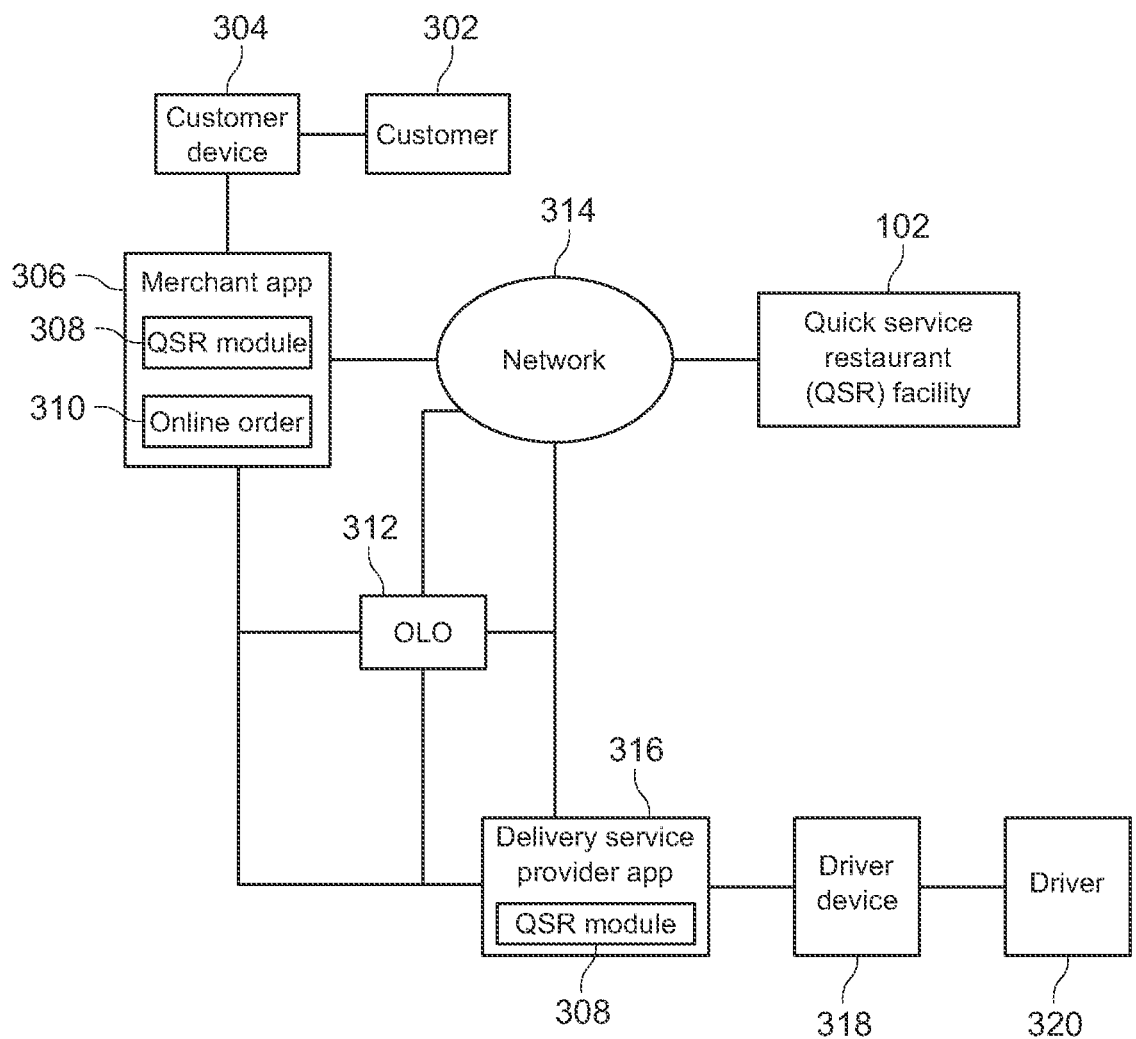
FIG. 3 depicts a block diagram of components of a system associated with the QSR facility ordering process.

FIG. 3 provides a block diagram of an exemplary set of components that make up the system for ordering food, drink, and/or non-food or drink items from the QSR facility 102. FIG. 4 provides a block diagram of additional exemplary components that make up the system for ordering online orders (e.g., online orders 310) available for pick up from a particular drive through restaurant 104 at the QSR facility 102.

In one embodiment, the restaurants 104 of the QSR facility 102 only provide orders to customers 302 and/or any associated delivery drivers 320 if the customers 302 have purchased their online orders 310 in advance of arrival at the drive through access lanes 106a-106d using one or more merchant applications 306 associated with each drive through restaurant 104. Accordingly, the customer 302, in a non-limiting embodiment, has to make selections for pick up from the drive through restaurants 104 using an online merchant application 306, and not through traditional in person means at the drive through restaurant 104 of the QSR facility 102. Accordingly, preferably, the customer 302 does not come to the QSR facility 102 to place an order for fulfillment from an ordering panel/display panel in front of the entrance to the drive through restaurant 104 and/or drive through lane 106 at the QSR facility 102. Rather, the customer 302 accesses a merchant application/module 306 using his or her customer computing device 304 and places an online order 310 for pick up from the one or more drive through restaurants 104a-104d at the QSR facility 102.

The merchant application 306 may be available as an application on the customer's 302 smartphone, tablet, computer, or other type of computing device 304. Further, the merchant application 306 may be accessible as a downloadable application on the customer computing device 304 or as a web service application. The merchant application 306 may be created exclusively for the specific drive through restaurant 104 and be a mobile merchant application that is solely associated with a drive through restaurant 104. Alternatively, the merchant application 306 may be associated with a third-party application that facilitates online ordering for a number of restaurants and locations. Some examples of such third-party applications include, but are not limited, to UBER EATS, DOORDASH, FAVOR, etc.

The online order 310 created by the customer 302 and provided through the merchant application 306 is communicated over a network 314 to the QSR facility 102 (and more specifically one or more drive through restaurant or store 104 of the QSR facility 102 as shown in FIG. 1). The system accordingly includes a network 314 which may include the Internet, LAN, WAN, wireless communication systems, cellular communication systems, telephony or other types of communication systems or protocols over which data is transmitted and communicated.

The online order 310 comprises the food, drink, and/or other items available for selection and purchase through the merchant application 306 and available for pick up from the drive through restaurant 104 at the QSR facility 102.

In a non-limiting embodiment, there may be a delivery service provider with an associated delivery service application 316 that can pick up the online order 310 instead of the customer 302. Drivers 320 associated with the delivery service provider and the delivery service application 316 may have access to the merchant application 306 and/or OLO 312 (as further described below) to receive notifications of pending online orders 310 that are requiring pick up from the QSR facility 102. In a non-limiting embodiment, the customer 302 can specify when the customer 302 schedules the online order 310 whether the customer 302 will be picking up the online order 310 from the QSR facility 102 or the online order 310 will be picked up on the customer 302's behalf by a driver 320.

In a non-limiting embodiment, a quick service restaurant (QSR) module 308 may be integrated with the merchant application 306 and also with any applications associated with the delivery service provider. The QSR module 308 is a computer program that communicates with the front end and back end system of each drive through restaurant 104 at the QSR facility 102. The QSR module 308 enables a user, whether the customer 302 or the driver 320, to receive relevant information from the drive through restaurant 104 at the QSR facility 102, including for example, the identifying gate entry code 410 and the arrival time 412 for the user (e.g., customer 302 or driver 320) to pick up the fulfilled order 414 as further explained below. The QSR module 308 may be hosted on one or more servers located at the drive through store 104 and/or any other location, including server 404 as shown in FIG. 4, and managed by an administrative entity responsible for the QSR module 308. The administrative entity may be associated with the QSR facility 102 and/or each particular drive through restaurant 104.

The QSR module 308 is enabled to provide relevant data from the merchant application 306 about the customer 304 to the computing system 402 of each relevant drive through store 104 in one or more non-limiting embodiments. The QSR module 308 may also communicate over the network 314 the relevant customer data to the driver 320 via the driver device 318 if a driver 320 is enabled to pick up the online order 310 for the customer 302. Such relevant customer data may include a phone number associated with the customer 302 that can be obtained from the merchant application 306 used to make the online order 310. Other types of customer data may also be relevant including, but not limited to, email address and/or physical address associated with the customer. In particular, it may be useful to obtain the customer phone number associated with the customer 302 who initially placed the online order 310 in order to be able to communicate the identifying gate entry code 410 and the arrival time 412 to the customer 302 in one non-limiting embodiment. If the driver 320 is enabled or selected to pick up the online order 310 from the drive through restaurant 104 at the QSR facility 102, the QSR module 308 can also communicate relevant information from the computing systems 402 of the drive through restaurant 104 to the driver computing device 318 via the QSR module 308 that is integrated in the delivery service provider applications 316 associated with delivery drivers.

Figure 7:
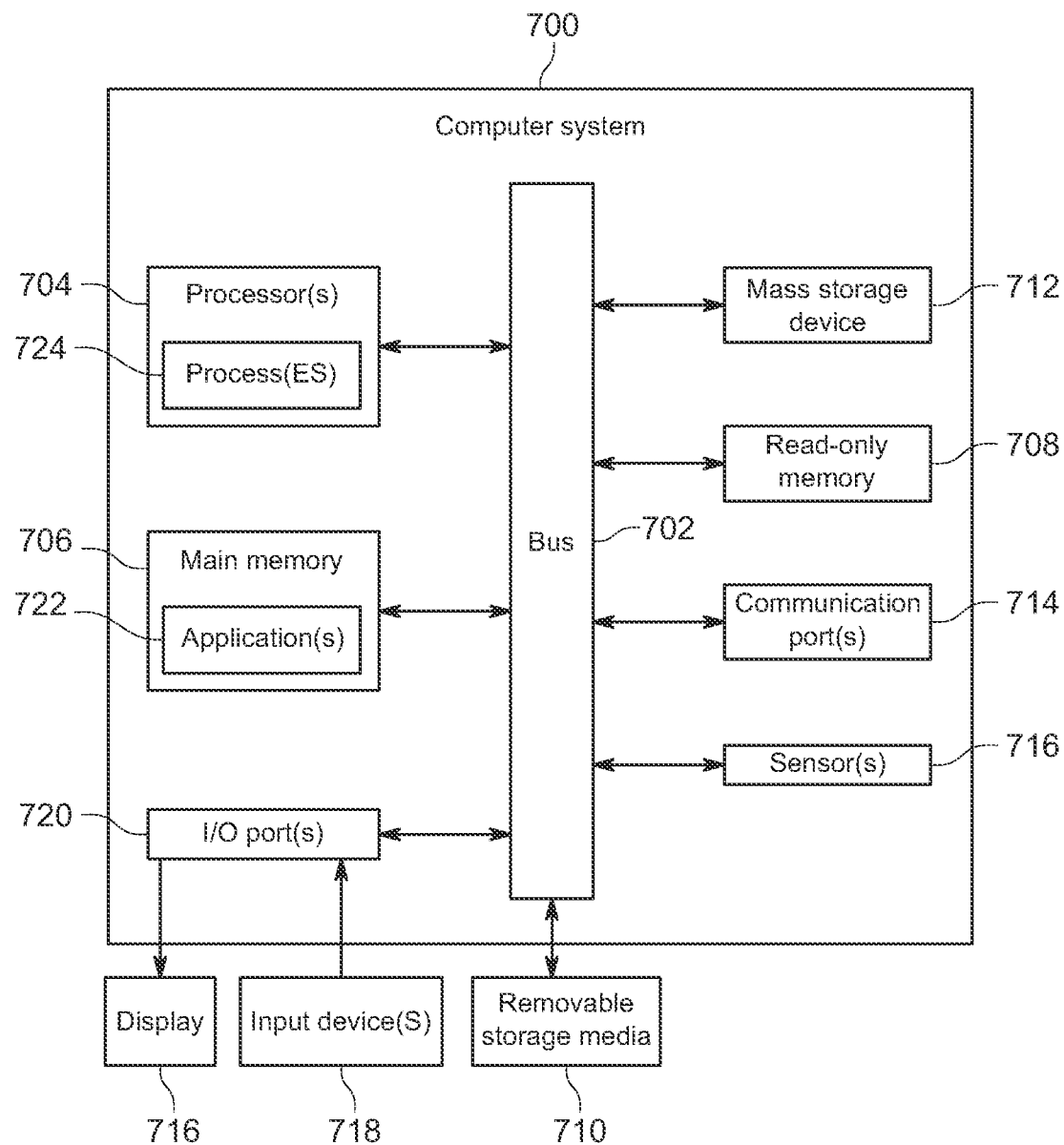
FIG. 7 is a block diagram of exemplary components of various computing devices used for the QSR system.

FIG. 4 shows additional information related to the system associated with picking up online orders 310 that become fulfilled orders 414 at the drive through restaurant 104 of the QSR facility 102. As noted above, each drive through restaurant 104 includes its own computing system 402, which may be similar to computer system 700 as shown in FIG. 7. The computing system 402 at each drive through restaurant 104 may include one or more computing devices having various interfaces for communicating with the customer device 304 and/or a driver device 318. In a non-limiting embodiment, the QSR module 308 is integrated and/or downloaded on one or more computing devices of the computing system 402 of each drive through restaurant 104. Any computer program information and modules, including the QSR module 308, may be hosted on one or more servers 404 associated with either each drive through restaurant 104 or the QSR facility 102 as a whole. The online order 310 is communicated to the computing system 402 and/or the online QSR module 308 of the drive through store 104. In a non-limiting embodiment, the merchant application 306 may have a module and/or interfaces that are accessible by and available to the computing system 402 as well.

In a non-limiting embodiment, each drive through restaurant 104 includes a gate 418 that acts as a barrier gate 418 to grant and/or deny access to the drive through lane 106 and/or drive through window or access point 110 at the drive through restaurant 104. The barrier gate 418 can be any form of security and/or parking gate. The gate 418 may include a form of a movable arm that extends up and down after a correct code or information is entered into the selection panel 422 of the gate 418 at the dedicated drive through lane 106 for each particular drive through restaurant 104 at the QSR facility 102. Alternatively, the barrier gate 418 may include a fence or gate that retracts and extends ahead of a vehicle 108 entering the drive through lane 106 of each drive through restaurant 104. Various forms of barrier gates 418 may be utilized without limitation thereto.

It is noted that the selection panel 422 may also be referred to as a display panel configured to receive information in alphanumeric form at the selection panel 422. Additionally, or alternatively, the selection panel 422 can process QR code information or other type of barcodes. In a non-limiting embodiment, the barrier gate 418 includes an operating system 420. The operating system 420 of the gate 418 may include one or more power sources, cameras, speaker, microphone and/or sensors. The gate 418 may further include its own processing units 424, including one or more processors, to process electronic information communicated to the barrier gate 418 and/or to and from the computing system 402 of the drive through restaurant 104. The gate 418 is intended to be in electronic communication and in signal communication with the computing systems 402, QSR module 308, and/or server 404 associated with the drive through restaurant 104.

In a non-limiting embodiment, the gate 418 acts as a mechanism to manage vehicle flow and access to the drive through restaurant 104. The customer 302 and/or pickup driver 320 is provided with an identifying gate entry code 410 to be granted access through the gate 418 located ahead of the drive through lane 106 of the drive through restaurant 104. In a non-limiting embodiment, the customer 302 and/or delivery driver 320 is also provided with an arrival time 412. The identifying gate entry code 410 and the arrival time 412 are also communicated to the processing units 424 of the gate 418. The gate 418 is programmed or enabled to only grant access to the user (who is likely either the customer 302 or the driver 320) who provides the identifying gate entry code 410 either the same time as the arrival time 412 or after the arrival time 412 has occurred. When the user enters the identifying gate entry code 410 at the same time or after the arrival time 412 has passed and occurred, then the gate 418 will grant access to the vehicle of the user to drive through the drive through lane 106 associated with the particular drive through store 104 having the fulfilled order 414 of the user (based off of the original online order 310 entered by the customer 302 in the mobile merchant application 306). Accordingly, any barrier arms or gates or fences associated with the gate 418 may be lifted and/or pulled away to allow access to the user's vehicle (e.g., vehicles 108*a*, 108*b*, 108*c*, and 108*d* as shown in FIG. 1 and in FIG. 5) at the QSR facility 102. However, if the user tries to enter the identifying gate entry code 410 before the arrival time 412 has occurred, such that the user has arrived too early, the gate 418 does not open and does not grant access to the user or the user's vehicle to pass through the gate 418. Rather, the user is directed to a dedicated waiting area 426 that is part of the layout and makeup of the QSR facility 102. Accordingly, the gate 418 and the customer 302 and/or the driver 320 all receive the identifying gate entry code 410 and arrival time 412 from the computing system 402 of the drive through store 104.

In a non-limiting embodiment, if the online order 310 has been fulfilled and is ready as a fulfilled order 414 for pickup prior to the estimated arrival time 412, the gate 418 may be communicated with by the computing system 402 to allow access based on the identifying gate entry code 410 being entered.

In a non-limiting embodiment, the QSR module 308 can communicate the identifying gate entry code 410 and arrival time 412 to the customer device 304 and/or driver device 318 in any number of ways. In one embodiment, the QSR module 308 integrated into the computer system 402 at the drive through restaurant 104 is able to communicate the identifying gate entry code 410 and arrival time 412 to the QSR module 308 integrated into the mobile merchant application (or "app") 306 which can then communicate the identifying gate entry code 410 and arrival time 412 to the monitoring customer 302 and/or driver 320. The identifying gate entry code 410 and arrival time 412 may be made available through interfaces of the merchant application 306 that are viewable on the computing device 304 of the customer 302 or the computing device 318 of the driver 320. Alternatively, the identifying gate entry code 410 and arrival time 412 may be communicated as a text message to the mobile computing device 304 of the customer 302 or the mobile computing device 318 of the driver 320. This may be performed automatically by coordinating the communication of the identifying gate entry code 410 and arrival time 412 through the QSR module 308 or another module associated with the drive through restaurant 104 to the customer device 304 and/or to the driver device 318. In a non-limiting embodiment, an employee at the drive through restaurant 104 can manually enter the identifying gate entry code 410 and arrival time 412 in a computing device associated with the computing system 402 of the drive through restaurant 104 such that the identifying gate entry code 410 and arrival time 412 are communicated via text message or another form of communication to the customer device 304 and/or the driver device 318 (e.g., via the phone number associated with the customer 302 and/or the driver 320). Accordingly, the identifying gate entry code 410 and arrival time 412 are transmitted through the computing system 402 of the drive through restaurant 104, including, but not limited, by using a device associated with the POS system 406 of the drive through restaurant 104 at the QSR facility 102.

In a non-limiting embodiment, the QSR module 308 for both the online merchant application 306 and the delivery service provider application 316 may be in communication with a platform known as OLO 312, which is shown in FIG. 3. OLO is a well known online ordering platform that allows restaurants to manage mobile device orders and allows customers to place restaurant orders, such as through the merchant application 306 associated with each drive through store 104 at the QSR facility 102, from multiple origination points such as from multiple customer devices 304. OLO 312 includes its own software that communicates with merchant application 306 and also with the delivery service provider application 316.

In a non-limiting embodiment, the APIs (Application Programming Interfaces) of the QSR module 308 associated with the merchant application 306, the delivery service provider application 316, and/or the computing system 402 of the drive through stores 104 is in communication with OLO 312. Through this communication with OLO via the APIs, the QSR module 308 associated with the computing system 402 in each drive through store 104 may be able to obtain relevant customer data and/or driver data to communicate to the customer 302 and to the driver 320 the identifying gate code entry 410 and the arrival time 412. In a non-limiting embodiment, the primary means of communication with the customer 302 and/or driver 320 designated to pickup the fulfilled order 414 may be through the telephone number associated with a customer device 304 or driver device 318 for the customer 302 or the driver 320 respectively. Additional relevant information such as email addresses obtainable via the QSR module 308 and/or the OLO platform 312 may also be communicated to the drive through restaurants 104 of interest at the QSR facility 102 so that the identifying gate entry code 410 and the arrival time 412 may be communicated via email and/or telephone (e.g., as a text message) to the relevant customer devices 304 and/or driver devices 318.

It is noted that in a non-limiting embodiment, there may be a bypass function or feature incorporated into the computing systems 402 and devices of the drive through stores 104 that allows the workers of the drive through store 104 to bypass the identifying gate entry code 410 being correct and/or the arrival time 412 having occurred in order for the gate 418 to automatically open and provide access to the drive through store 104. Rather, the bypass function may be selected that allows a worker, including management of the drive through store 104, to open the gate 418 from the interior of the drive through store 104 if needed to allow users or other parties to pass through the gate 418. This may be necessary if circumstances arise and the gate 418 stops working properly for some reason and/or if deliveries need to be made and access through the gate 418 is required. There may be a myriad of reasons why the bypass function may be selected by a worker within the drive through restaurant 104 to bypass denying access to a particular vehicle 108.

In a non-limiting embodiment, the system at the QSR facility 102 may also utilize a user identifying device 426 in order to ensure that a correct order is provided to the correct recipient associated with the fulfilled order 414. In a non-limiting embodiment, the user identifying device 426 may be a scanner, including a barcode scanner. For every fulfilled order 414 that is made ready for pick up from the drive through lane access point 110, there may be a barcode included on a label that is attached to or adhered to (e.g., via tape) the physical packaging of the order. In a non-limiting embodiment, the barcode may be the same as the unique identifying gate entry code 410 provided to the customer 302 and/or the driver 320. When the user identifying device 426 scans the barcode, the same identifying gate entry code 410 as entered by the recipient should appear on one or more computing devices for the computing system 402 of the drive through store 104 to ensure that the particular order matches the online order 310 intended to be picked up by the particular customer 302 and/or driver 320. In a non-limiting embodiment, each identifying gate entry code 410 is unique to each user and is not generic. Further, in a non-limiting embodiment, each identifying gate entry code 410 may be the same as the order number associated with the order.

Further, in a non-limiting embodiment, the waiting area 426 may include numbered spots or regions to which the user (e.g., customer 302 or driver 320) may be directed to wait if the user arrives before the arrival time 412 that the online order 310 becomes the fulfilled order 414 and is ready for pick up. The selection panel 422 at the gate 418 or another device associated with the gate 418 may display the numbered spot to direct the user to when the gate 418 denies access through the gate to the drive through lane 106 associated with the drive through store 104 if the user arrives too early (i.e., before the arrival time 412). Further, the number for the numbered spot associated with the waiting area may be viewable and available to employees of the drive through store 104 as well in case the workers will physically bring the fulfilled order 414 to the waiting user in the waiting area 426 at a designated numbered spot. The term "numbered" as used in this context may include alphanumeric symbols and may also include other symbols, drawings, or imagery to communicate a designated waiting area for the user.

Figure 5:
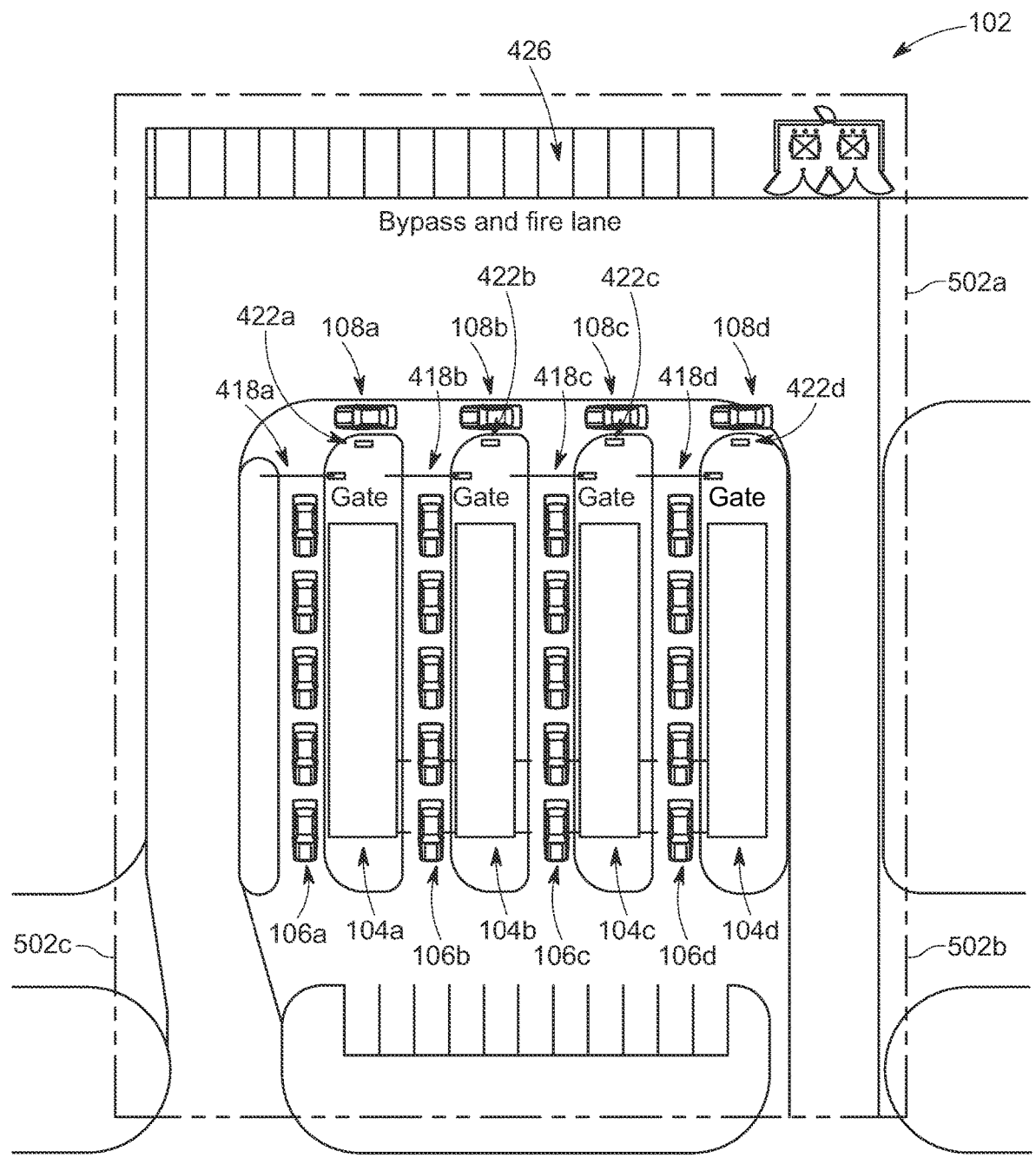
FIG. 5 depicts an exemplary schematic of a layout of the QSR facility including displaying exemplary gates for each drive through store and drive through lanes and a waiting area.

FIG. 5 shows a schematic of a top-down view of a QSR facility 102 according to an exemplary make up. As shown in FIG. 5, there may be at least four drive through stores/restaurants 104a, 104b, 104c, and 104d in a non-limiting embodiment. There may be a greater or lesser number of drive through stores 104 than shown in FIG. 5 in alternative embodiments.

As shown in FIG. 5, each drive through store 104 has its own dedicated individual electronic barrier gate 418 that prevents entry into the drive through lane 106 and drive through access point 110 of each drive through store 104 unless the correct identifying gate entry code 410 and correct arrival time 412 is entered into the selection panel 422 of each gate 418.

As shown in FIG. 5, the drive through stores 104a-104d all have physical structures built onto the premises of the QSR facility 102. Each drive through store 104a-104d may have a dedicated drive through lane 106 (e.g., as shown in FIG. 1) and each drive through store 104a-104d may be arranged in parallel to each other as shown in FIG. 5. From the main access points 502a, 502b, 502c of the QSR facility 102, the vehicles 108 may drive to each drive through store 104 and be enabled to wait in front of the gate 418a, 418b, 418c, and 418d for each drive through lane 106a, 106b, 106c, and 106d associated with each drive through store 104a, 104b, 104c, and 104d. As shown for example, in FIG. 5, vehicle 108a is shown waiting in front of a selection panel 422a which is associated and operatively communicates with gate 418a. Vehicle 108b is shown waiting in front of selection panel 422b which is associated and operatively communicates with gate 418b. Vehicle 108c is shown waiting in front of a selection panel 422c which is associated and operatively communicates with gate 418c. Vehicle 108d is shown waiting in front of selection panel 422d which is associated and operatively communicates with gate 418d.

Each user of each vehicle 108a-108d has to enter in an identifying gate entry code 410 at each selection panel 422a-422d for each gate 418a-418d. The processing units 424 of each gate 418a-418d compares the arrival time of the user with arrival time associated with the identifying gate entry code 410 and therefore with the intended user (e.g., customer 302 or driver 320). If the processing units 424 of each gate 418a-418d determine that the user is on time or the arrival time has passed and the identifying gate entry code 410 is valid, then the gates 418a-418d open and allow entry through to the main drive through lanes 106a-106d of each drive through restaurant 104a-104d so that the user can pick up their fulfilled order 414 and drive away from the QSR facility. However, if the processing units 424 of each gate 418a-418d determine that the user is too early and the arrival time has not yet occurred, in one non-limiting embodiment, the user is directed to waiting area 426 that is made a part of the QSR facility 102 premises, as shown in FIG. 5. Further, as noted above, each parking spot for the waiting area 426 may be numbered and the user is directed from the selection panel 422 displaying a particular numbered parking spot of the waiting area 426 in a non-limiting embodiment. Further, in other embodiments, the selection panel 422 may also provide an updated arrival time or a reminder of the arrival time associated with the identifying gate entry code 410. The user may be directed to try again and return to the gate 418a-418d associated with the respective drive through store 104 when the arrival time 412 occurs in cases when the user is too early.

In other embodiments, there may be a built-in bypass function incorporated in the computing system 402 of the drive through store 104 so that the workers in the drive through restaurants 104a-104d can choose to allow the user through the gates 418a-418d to the drive through lanes 106a-106d and to pick up a fulfilled order 414. The bypass feature allows the workers of the drive through store 104 the flexibility to open the gate 418 if needed and in case any unique circumstances occur. In general, it is intended that users will become accustomed to not arriving at the QSR facility 102 before the provided arrival time 412, whereby the provided arrival time 412 coincides with the expected time needed to make the items ordered by the customer 302. This procedure may help to avoid heavy traffic jams at the gates 418 of the drive through restaurants 104 at the QSR facility 102 because the users that arrive are aware that they should arrive on time or after the arrival time 412 communicated to the user.

In a non-limiting embodiment, when the user is granted access through gates 418a, 418b, 418c, and 418d to the particular drive through restaurant 104a, 104b, 104c, and 104d, it is intended that an orderly line of vehicles 108 may line up to access the drive through access point 110 and that the workers will have notice to some degree which users are arriving to collect fulfilled orders 414 by virtue of the identifying gate entry code 410 provided by the user at the gates 418a-418d. Accordingly, the workers of the drive through store 104 may arrange any fulfilled orders 414 at the drive through access point 110 (e.g., window or other opening) in such a way as to make it easier to hand the packages of the fulfilled orders 414 to the vehicles 108 based on the order of the identifying gate entry codes 410 as entered by the users. Accordingly, the above described system and process may provide an improved means to organize and coordinate the pick up of online orders made in advance of arriving at the QSR facility 102.

Figure 6:
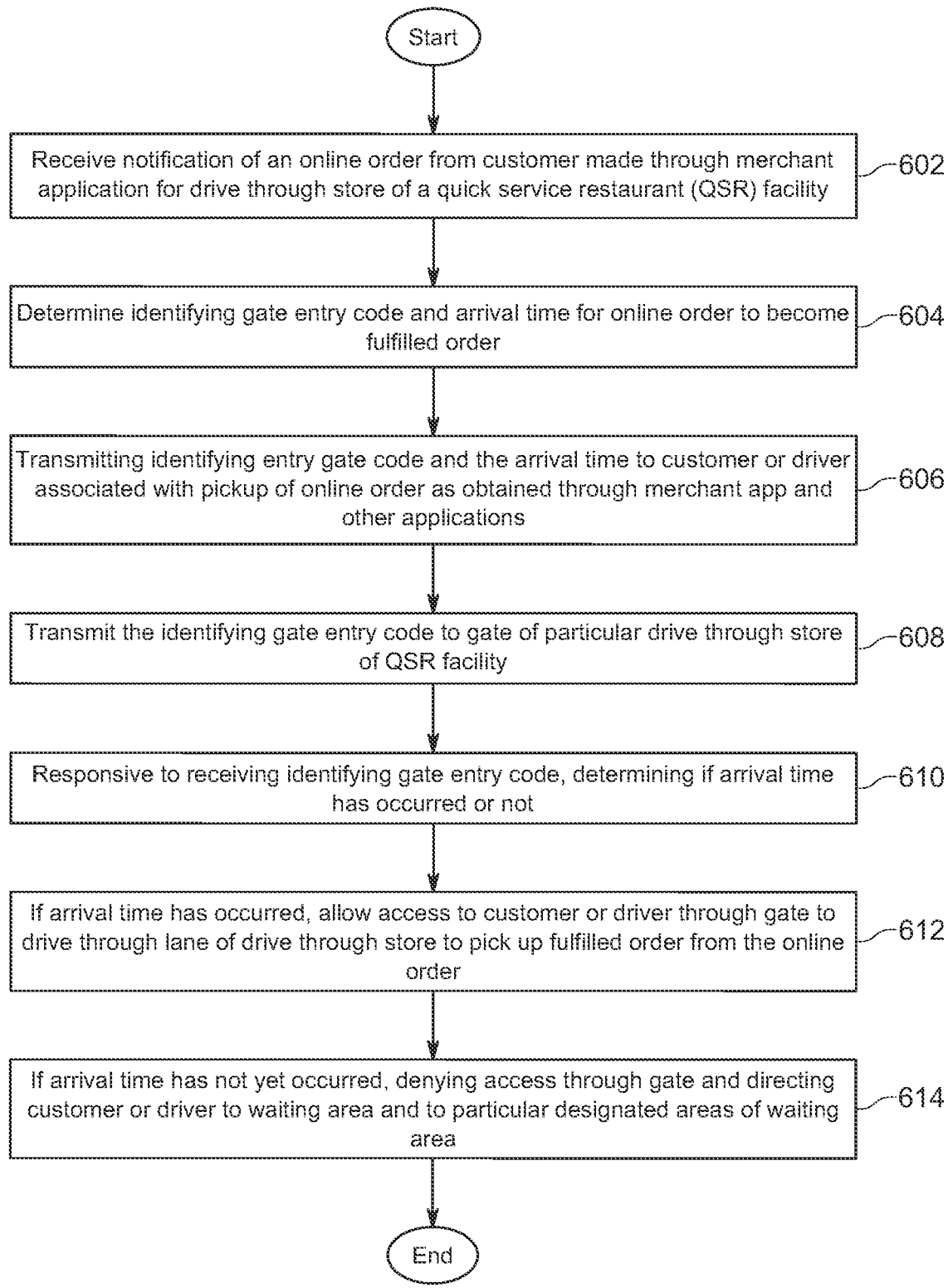
FIG. 6 is a flowchart of an exemplary method of coordinating online orders for a QSR facility.

FIG. 6 is a flowchart of an exemplary process for coordinating the pickup of online orders 310 from the various drive through restaurants 104 at the QSR facility 102. In a non-limiting embodiment, at 602, the method may include receiving notification of an online order 310 made by a customer 302 through an online mobile merchant application 306 for a drive through store 104 of a QSR facility 102. At step 604, the method may include determining an identifying entry gate code 410 and arrival time 412 for an online order 310 to become a fulfilled order 414. At step 606, the method may include transmitting the identifying gate entry code 410 and the arrival time 412 to the customer 302 or driver 320 associated with the pickup of an online order 310 as obtained from the merchant application 306 and/or other applications 316 in one or more non-limiting embodiments. At step 608, the computer implemented method may further include transmitting the identifying gate entry code 410 to the particular gate 418 for the particular drive through restaurant 104. At step 610, responsive to receiving the identifying gate entry code 410 at the gate 418 (which is presumably entered by either the customer 302 or the driver 320), determining if the arrival time 412 that corresponds to the identifying gate entry code 410 has occurred or not. At step 612, if it is determined that the arrival time 412 has occurred, the method includes allowing access to the customer 302 or the driver 320 through the gate 418 to the drive through lane 106 of the drive through store 104 to pick up the fulfilled order 414 that was based on the online order 310. At step 614, if the arrival time 412 has not yet occurred, the method may include denying access through the gate 418 and directing the customer 302 or the driver 320 to the waiting area 426 and to a particular designated area of the waiting area 426.

FIG. 7 is a schematic diagram of a computer system 700 upon which embodiments of the present disclosure may be implemented and carried out. According to the present example, the computer system 700 includes a bus 702 (i.e., interconnect), one or more processors 704, one or more communications ports 714, a main memory 706, removable storage media 710, read only memory 708, and a mass storage device 712. Communication port(s) 714 may be connected to one or more networks by way of which the computer system 700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) can be (or include) any known processor, such as, but not limited to, an Intel® Itanium® or Itanium 2® processor(s), AMD® Opteron® or Athlon MP® processor(s), or Motorola® lines of processors, and the like. Communications port(s) can be any of an RS232 port for use with a modem-based dialup connection, a 10/100 Ethernet port, a Gigabit port using copper or fiber, or a USB port, and the like. Communications port(s) 14 may be chosen depending on a network such as a Local Area Network (LAN), a Wide Area Network (WAN), a CDN, or any network to which the computer system 700 connects. The computer system 700 may be in communication with peripheral devices (e.g., display screen, input device(s) 718) via Input/Output (I/O) port 720. Some or all of the peripheral devices may be integrated into the computer system 00, and the input device(s) 718 may be integrated into the display screen 716 (e.g., in the case of a touch screen). Additionally, sensors 730 having various sensing functions may be included as well as part of the computer system 700.

Main memory can be Random Access Memory (RAM), or any other dynamic storage device(s) commonly known in the art. Read only memory can be any static storage device(s) such as Programmable Read Only Memory (PROM) chips for storing static information such as instructions for processor(s) 704. Mass storage 712 can be used to store information and instructions. For example, hard disks such as the Adaptec® family of Small Computer Serial Interface (SCSI) drives, an optical disc, an array of disks such as Redundant Array of Independent Disks (RAID) and the Adaptec® family of RAID drives, or any other mass storage devices may be used.

Bus 702 communicatively couples processor(s) 04 with the other memory, storage and communications blocks. Bus 702 can be a PCI/PCIX, SCSI, a Universal Serial Bus (USB) based system bus (or other) depending on the storage devices used, and the like. Removable storage media 710 can be any kind of external harddrives, floppy drives, IOMEGA® Zip Drives, Compact Disc-Read Only Memory (CDROM), Compact Disc-ReWritable (CDRW), Digital Versatile Disk-Read Only Memory (DVDROM), etc.

Embodiments herein may be provided as one or more computer program products, which may include a machine readable medium having stored thereon instructions, which may be used to program a computer (or other electronic devices) to perform a process. As used herein, the term "machine readable medium" refers to any medium, a plurality of the same, or a combination of different media, which participate in providing data (e.g., instructions, data structures) which may be read by a computer, a processor, or a like device. Such a medium may take many forms, including but not limited to, nonvolatile media, volatile media, and transmission media. Nonvolatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine readable medium may include, but is not limited to, floppy diskettes, optical discs, CDROMs, magnetooptical disks, ROMs, RAMs, erasable programmable read only memories (EPROMs), electrically erasable programmable read only memories (EEPROMs), magnetic or optical cards, flash memory, or other type of media/machine readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards, or protocols; and/or (iv) encrypted in any of a variety of ways well known in the art.

A computer readable medium can store (in any appropriate format) those program elements that are appropriate to perform the methods.

As shown, main memory is encoded with application(s) 722 that support(s) the functionality as discussed herein (an application may be an application that provides some or all of the functionality of one or more of the mechanisms described herein). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory via the use of bus 702 in order to launch, run, execute, interpret, or otherwise perform the logic instructions of the application(s) 722. Execution of application(s) produces processing functionality of the service(s) or mechanism(s) related to the application(s). In other words, the process(es) represents one or more portions of the application(s) 722 performing within or upon the processor(s) 704 in the computer system 700.

It should be noted that, in addition to the process(es) 724 that carries (carry) out operations as discussed herein, other embodiments herein include the application 722 itself (i.e., the unexecuted or nonperforming logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory (e.g., within Random Access Memory or RAM). For example, application may also be stored in removable storage media, read only memory, and/or mass storage device.

Those skilled in the art will understand that the computer system can include other processes and/or software and hardware components, such as an operating system that controls allocation and use of hardware resources.

As discussed herein, embodiments of the present invention include various steps or operations. A variety of these steps may be performed by hardware components or may be embodied in machine executable instructions, which may be used to cause a general purpose or special purpose processor programmed with the instructions to perform the operations. Alternatively, the steps may be performed by a combination of hardware, software, and/or firmware. The term "module" refers to a self contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer readable medium storing a program or data structure include a computer readable medium storing a program that, when executed, can cause a processor to perform some (but not necessarily all) of the described process.

Where a process is described herein, those of ordinary skill in the art will appreciate that the process may operate without any user intervention. In another embodiment, the process may include some human intervention (e.g., a step is performed by or with the assistance of a human).

There may be many other useful applications for the one or more components of the system in the one or more non-limiting embodiments presented above, and multiple advantages and benefits.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. The term "set" as used herein may refer to one or more of an item.

What is claimed is:

1. A computer implemented method comprising: providing a quick service restaurant (QSR) fulfillment facility having separate multiple drive through restaurants for managing a pick up time for a recipient of an online order to pick up the online order at a specific drive through restaurant of the QSR fulfillment facility, wherein each drive through restaurant of the separate multiple drive through restaurants at the QSR fulfillment facility comprises an individual electronic barrier gate for each drive through lane of each drive through restaurant, wherein the individual electronic barrier gate for each drive through lane of each drive through restaurant grants or denies access to a customer or delivery driver trying to access the specific drive through restaurant responsive to receiving an identifying gate entry code and an arrival time, further comprising, allowing access to the customer or to the delivery driver to a pick up window or other access point of the specific drive through restaurant that is located a distance behind a specific individual electronic barrier gate on a specific drive through lane associated with the specific drive through restaurant only if a correct identifying gate entry code is entered at a correct arrival time, wherein only the specific drive through restaurant is accessible by the pickup window or other access point and not any other restaurant of the separate multiple drive through restaurants; by one or more computer systems, receiving a notification for the online order from the customer for an item provided by the specific drive through restaurant store of the multiple drive through restaurants, wherein the online order is made by the customer and purchased by the customer on an online application associated with the specific drive through restaurant in advance of arriving at the QSR fulfillment facility and not at the particular drive through restaurant; by one or more computer systems, after receiving the notification for the online order and prior to admission of the recipient past the individual electronic barrier gate of the specific drive through restaurant store, determining the identifying gate entry code and the arrival time to transmit to the customer or the delivery driver to pick up a fulfilled order from the specific drive through restaurant of the multiple drive through restaurants at the QSR fulfillment facility, wherein determining the arrival time further comprises calculating the arrival time based on items selected for the online order, wherein the arrival time is calculated by a QSR computer module integrated into the one or more computer systems of the specific drive through restaurant at the QSR fulfillment facility; by one or more computer systems, transmitting the identifying gate entry code and the arrival time to a phone number of the customer or to the delivery driver associated with the online order, wherein the arrival time is an expected time when the fulfilled order is expected to be ready for pick up from the specific drive through restaurant at the QSR fulfillment facility, wherein transmitting the identifying gate entry code and the arrival time to the customer or to the delivery driver associated with the online order who will pick up the fulfilled order further comprises communicating the identifying gate entry code and the arrival time to the phone number of the customer or to the delivery driver such that the customer and/or delivery driver receives the identifying gate entry code and the arrival time to be entered into the individual electronic barrier gate prior to the admission through the individual electronic barrier gate of the specific drive through restaurant further comprising: transmitting via a text message to the phone number for either the customer or the delivery driver the identifying gate entry code and the arrival time; by one or more computer systems, transmitting the identifying gate entry code and the arrival time to an operating system of the individual electronic barrier gate of the specific drive through restaurant where the online order is expected to be ready for pickup; by one or more computer systems, responsive to receiving the identifying gate entry code at a display panel for the individual electronic barrier gate from the customer or the delivery driver, determining, by a processor associated with the individual electronic barrier gate, whether the arrival time associated with the identifying gate entry code has occurred or has not yet occurred; by one or more computer systems, responsive to determining that the arrival time associated with the identifying gate entry code has passed, allowing access to the drive through lane associated with the specific drive through restaurant at the QSR fulfillment facility; by one or more computer systems, responsive to determining that the arrival time associated with the identifying gate entry code has not yet occurred, denying access through the individual electronic barrier gate, wherein the individual electronic barrier gate does not automatically open to allow a vehicle to pass through to the drive through restaurant; and responsive to the arrival time associated with the identifying gate entry code not yet occurring, directing the vehicle using signaling equipment or other means of communication to wait in a dedicated waiting area associated with the QSR fulfillment facility until the arrival time occurs.

2. The computer implemented method of claim 1, wherein obtaining the telephone number for either the customer or the delivery driver from the online application further comprises having the QSR computer module integrated into one or more computer systems of the specific-drive through restaurant at the QSR fulfillment facility, wherein the computer module communicates with the online application and is adapted to obtain the telephone number of either the customer or the delivery driver associated with the online order.

3. The computer implemented method of claim 2, wherein the QSR computer module is also integrated with an online merchant application.

4. The computer implemented method of claim 2, wherein the QSR computer module integrated into the one or more computer systems of the specific drive through restaurant at the QSR fulfillment facility communicates with an online ordering (OLO) platform to obtain the telephone number of the customer or the delivery driver associated with the online order.

5. The computer implemented method of claim 1, wherein calculating the arrival time based on the items selected further comprises retrieving from storage associated estimated times for preparation of the items selected by the customer for the online order and calculating a sum total to achieve the arrival time based on a sum of the estimated times.

6. The computer implemented method of claim 1, wherein transmitting the identifying gate entry code and the arrival time to the customer or to the delivery driver further comprises providing the identifying gate entry code and the arrival time through the online application or delivery services application associated with the online application or through a separate application associated with the QSR fulfillment facility that is accessible by the customer or the delivery driver.

7. The computer implemented method of claim 1, wherein the identifying gate entry code is also an order number associated by the specific drive through restaurant with the online order.

8. The computer implemented method of claim 1, further comprising, responsive to directing the customer or the delivery driver to the dedicated waiting area, providing a prompt regarding the arrival time in order to enable the customer or the delivery driver to return to the individual electronic barrier gate at or after the arrival time.

9. The computer implemented method of claim 1, further comprising, receiving notification of a type of the vehicle associated with the customer or the delivery driver and transmitting the notification of the type of the vehicle to a point of sale (POS) system of the specific-drive through restaurant or to another application associated with a computing device of the specific drive through restaurant in order to associate the type of the vehicle with the online order and an order number to ensure the online order is correctly provided to a correct customer or correct delivery driver picking up the online order.

10. The computer implemented method of claim 1, further comprising, associating the identifying gate entry code with the fulfilled order for pick up by the customer or the delivery driver.

11. The computer implemented method of claim 1, further comprising, using a user identification device to check that an order being provided to the recipient is correct, further comprising, using the user identification device to scan or otherwise communicate with a barcode located on a physical package containing the order and checking that the barcode is associated with the online order.

12. The computer implemented method of claim 11, wherein the user identification device is a scanner.

13. The computer implemented method of claim 11, wherein the barcode placed on the order is associated with the identifying gate entry code.

14. The computer implemented method of claim 13, wherein the identifying gate entry code is unique to the recipient.

\* \* \* \* \*